United States Patent

[11] 3,610,876

| [72] | Inventor | Gopal Krishna Bhat<br>172 Boxfield Road, Pittsburgh, Pa. 15241 |
|---|---|---|
| [21] | Appl. No. | 886,998 |
| [22] | Filed | Dec. 22, 1969 |
| [45] | Patented | Oct. 5, 1971 |

[54] VARIABLE PARAMETER TUNGSTEN-INERT GAS WELDING
14 Claims, 3 Drawing Figs.

[52] U.S. Cl. .................................................. 219/137, 219/75, 219/76
[51] Int. Cl. .................................................. B23k 9/00
[50] Field of Search .......................................... 219/137, 61, 74, 75, 76

[56] References Cited
UNITED STATES PATENTS

| 1,868,998 | 7/1932 | Stresau | 219/137 |
| 2,438,593 | 3/1948 | Wright | 219/125 |
| 2,490,024 | 12/1949 | Bernard | 219/137 X |
| 2,866,074 | 12/1958 | Ronay | 219/74 |
| 3,075,948 | 1/1963 | Johnson | 219/137 |
| 3,483,354 | 12/1969 | Manz et al. | 219/137 |

*Primary Examiner*—J. V. Truhe
*Assistant Examiner*—George A. Montanye
*Attorney*—Lane, Aitken, Dunner & Ziems ABSTRACT: There is disclosed herein a modified Tungsten-Inert Gas welding process for joining relatively thick high-strength steel plates by depositing multiple layers of weld metal in a groove between the plates. For each layer, the arc voltage, arc current and feed rate of filler material are adjusted to provide uniform heat input to the weld for varying size weld deposits. The weld layers formed from the successive passes extend along the length and across the width of the weld groove, and are of substantially uniform thickness. The top one or two weld layers may be side-by-side weld deposits which extend along the length of the joint and overlap intermediate the width of the groove. The weld groove is V-shaped and wide enough at its top to permit clearance of the welding electrodes when depositing the lowermost layer.

PATENTED OCT 5 1971 3,610,876

INVENTOR
GOPAL KRISHNA BHAT

BY
Lane, Aitken, Dunner & Ziems
ATTORNEYS

VARIABLE PARAMETER TUNGSTEN-INERT GAS WELDING

BACKGROUND OF THE INVENTION

The present invention relates to arc welding, and more particularly to a modified Tungsten-Inert Gas (TIG) welding process for joining high-strength steel plates on the order of three-fourths inch thick or greater.

In conventional TIG welding, an arc is established between a nonconsumable tungsten electrode and the workpiece. The weld metal deposit is formed by a fusible filler material, e.g., in wire form which is fed into the arc where it is heated and melted. A shield of pressurized inert gas (helium, argon, etc.) is provided about the arc and the molten weld deposit to protect against contamination, oxidation, or other damage to the weld arising from exposure to the atmosphere during deposition.

The TIG process has numerous advantages, particularly in providing a strong weld joint. However, the process is relatively slow and is therefore ordinarily limited to joining relatively thin plates, for example, on the order of one-tenth to one-eighth inch thick, for which only a single pass of the welding electrode is required to form the weld joint. For relatively thin plates of high-strength and ultra-high-strength steel, for example, 18 percent nickel maraging steel, the strong joint provided by the TIG process has made it the preferred technique.

The conventional TIG precess is characterized by relatively low arc current, i.e., less than about 200 amperes. Greater current produces excessive heat with a resulting excessively large weld puddle, thereby providing more weld metal than necessary for joining the relatively thin plates. In addition, if the heat due to high current is not consumed in melting the filler material, unnecessarily large portions of the metal plates being welded are heated, resulting in undesirable metallurgical variations which produce a concomitant degradation of mechanical properties such as fracture toughness.

Substantial difficulty was encountered in attempting to employ the TIG process in welding high-strength and ultra-high-strength steel plates on the order of one-fourth inch thick. The approach first taken was to employ the TIG process with multiple passes of the welding electrode to deposit multiple layers of filler metal in forming the resulting weld joint. This was undesirable however, because high-strength steels tend to be relatively heat sensitive and subject to cracking due to cyclic variations in temperature. More particularly, it was found that in making multiple welding passes, a relatively large portion of the parent metal was heated and cooled with each pass and as the number of passes increased so did the tendency toward cracking. In addition, excessive heating of the parent metal was found to produce metallurgical degradation, particularly as relates to grain growth in the heat-affected zone with resulting loss of tensile strength, ductility and fracture resistance.

Eventually it was found that high-strength steel plates on the order of one-fourth inch thick could be joined using the TIG process if the arc current was increased above 200 amperes. In addition, the welding apparatus was modified to accommodate a larger tungsten electrode and more extensive gas shielding for the larger weld area. With such a modification, it was possible to weld plates on the order of ¼-inch to 1 inch thick without requiring multiple weld passes. While this modification may seem straightforward, its development was met with much skepticism, and its utilization encountered extreme industry-wide resistance. Subsequently, however, the success of the process overcame the skepticism and resistance and the new process, frequently referred to as the "big TIG" process is presently the accepted process for welding high-strength and ultra-high-strength steel plates of this size.

Unfortunately, for thicker plates, the "big TIG" process was found to be too slow. Moreover, attempts to use multiple passes of the welder proved unsuccessful since the multiple passes results in cyclic heating of the parent metal, causing the previously mentioned tendency toward cracking of the parent metal. Further, a wide area of the parent metal is heated during the multiple passes, producing unsatisfactory fracture strengths in the parent metal. These reasons, together with the slowness of the "big TIG" process, have necessitated development of an improved welding process, suitable for joining high-strength steel plates especially of thicknesses of three-fourths inch or more.

For joining thick plates of ordinary steel (as opposed to high-strength steel), the conventional "submerged arc flux" welding process is quite satisfactory. However, for high-strength steels, the weld deposit formed by the submerged arc flux process exhibits poor mechanical properties, particularly as to fracture resistance with the weld being considerably weaker than the parent metal. This is undesirable since it is usually required for high-strength applications that the weld strength and fracture resistance properties be at least 90 percent that of the parent metal.

SUMMARY OF THE PRESENT INVENTION

In accordance with the principles of the present invention, a welded joint is formed utilizing a variable welding parameter TIG process, the welded joint comprising a plurality of flat or generally pancake-shaped weld layers deposited in successive superposed relation in the weld groove. Each layer comprises a thin weld deposit formed with a single pass of the welder along the length of the groove. The weld layers are preferably of about equal thickness and have uniform areas of fusion at the weld deposit-parent metal interface. Successive layers are deposited utilizing appropriately adjusted arc voltages, arc currents and filler material feed rates to assure that the heat input to the parent metal is essentially constant irrespective of the size of the weld deposit. The speed at which the electrode traverses the length of the weld is held substantially constant from pass to pass. Proper cooling between weld layers is provided to assure formation of the proper metallurgical structure.

Providing flat welds of uniform thickness permits uniform control of the heat-affected zone of the parent metal from pass to pass and avoids excessive heating of the parent metal. Variation of the welding parameters (arc voltage, arc current, and filler material feed rate) from pass to pass assures geometric and metallurgical uniformity for the successive weld layers without the undesirable consequences of excessive parent metal heating.

In accordance with this invention, a V-shaped groove between the plates of parent metal to be welded is preferably employed. The groove is thus made sufficiently wide to provide clearance for the end of the welding electrode when depositing the lowermost layer along the length of the weld groove without the necessity for an excessively wide weld deposit at the base of the weld.

In a preferred embodiment, the two top layers of the weld do not extend over the entire width of the weld groove but rather are formed by making two separate but adjacent passes of the welding electrode along the groove length. A single flat weld layer at the top of the weld joint often produces an area of lack of fusion at the top of the weld joint at the weld deposit-parent metal interface. The two adjacent welds promote proper fusion at the interface.

Another subsidiary feature of the present invention involves the provision of a trailing shield of inert gas immediately behind the gas-shielded electrode as it moves along the length of the weld groove. This feature provides protection from contamination of the cooling portion of the molten weld.

BRIEF DESCRIPTION OF THE DRAWINGS

Accordingly, it is a basic object of the present invention to provide an improved welding process for joining relatively thick plates of high-strength steel. It is a more particular object of the invention to provide a modification of the TIG welding process suitable for joining relatively thick plates of high-strength steel.

It is a further object of this invention to provide an improved multipass TIG welding process for thick plates of high-strength steel which provides a uniform heat input to the parent metal for each layer of the weld deposit.

It is still another object of the present invention to provide a modified TIG welding process for joining relatively thick plates of high-strength steel in which there is a minimum heat-affected zone in the parent metal and a low tendency toward parent metal cracking, and wherein the weld itself has an extremely high fracture toughness.

It is still another object of the present invention to provide an arc welding process suitable for joining relatively thick metal plates in which a plurality of weld layers comprise the welded joint and in which the heat-affected zone in the parent metal plates is minimized.

It is still another object of the present invention to provide a variable parameter TIG welding process in which multiple flat weld layers of substantially uniform thickness are deposited utilizing successively varied welding parameters.

It is also an object of this invention to provide an arc welding process for thick plates of high-strength steel in which successive deposits of weld metal are made in a tapered weld groove by TIG techniques, with each successive deposit resulting in substantially constant heat input to the parent metal by virtue of variation of welding current, voltage, and filler metal feed, with sufficient cooling between layers to assure formation in each layer of the desired metallurgical-structural properties.

Figure 1:
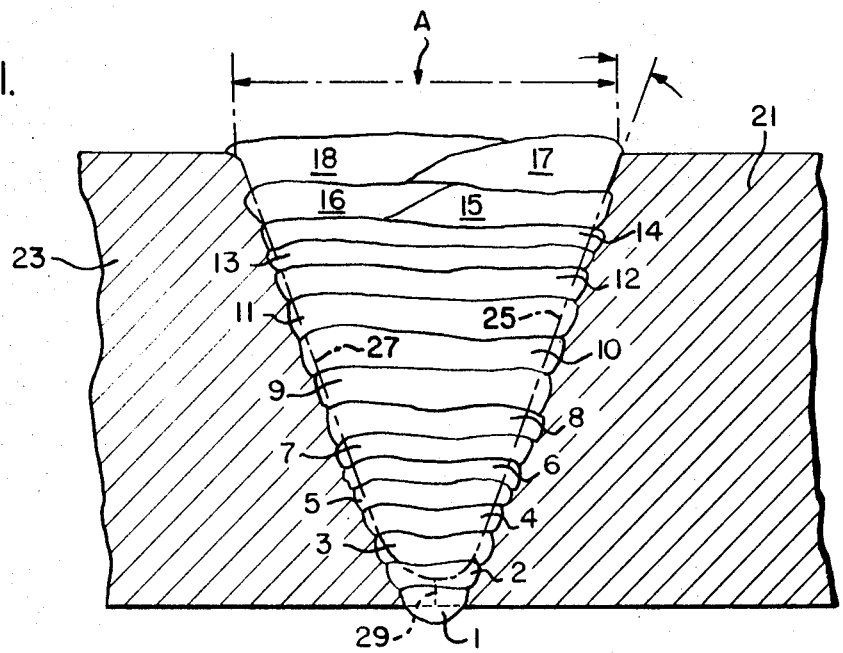
Figure 2:
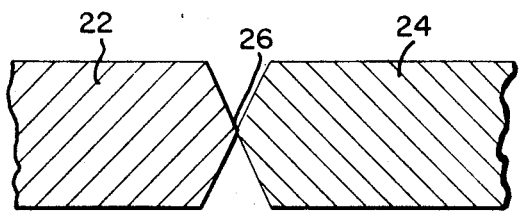

The above and still further objects, features and advantages of the present invention will become apparent upon consideration of the following detailed description of one specific embodiment thereof, especially when taken in conjunction with the accompanying drawings, wherein:

FIG. 1 is a vertical section taken through a weld typical joint formed in accordance with the principles of the present invention;

FIG. 2 is an alternative weld groove configuration; and

Figure 3:
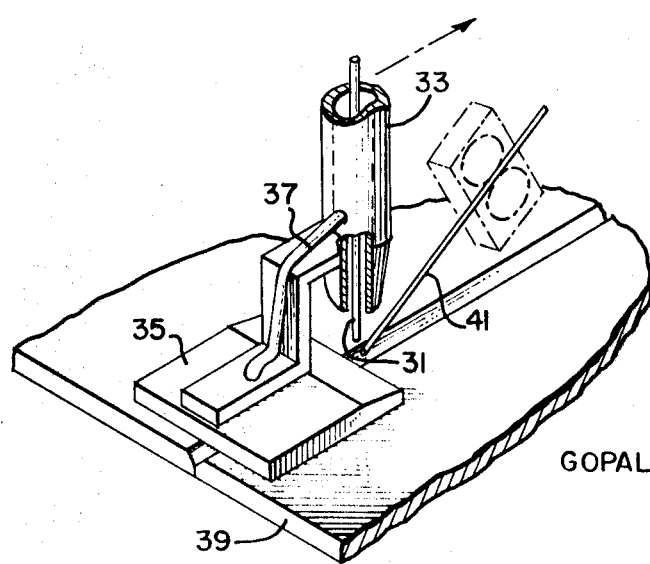

FIG. 3 is a view in perspective of a typical TIG welding apparatus employing the trailing gas shield of the present invention.

DESCRIPTION OF THE PREFERRED EMBODIMENTS

Referring now specifically to FIG. 1 of the accompanying drawings, there is illustrated a welded joint formed by arc welding techniques in accordance with the principles of the present invention. Two metal plates 21 and 23, normally of high-strength steel, for example, 18 percent nickel maraging steel, are placed in edge-to-edge relation. The opposing edges 25 and 27 of plates 21 and 23, respectively, abut at interface 29 at the lowermost portion of the weld joint as viewed in FIG. 1. Edges 25 and 27 diverge from interface 29 to form a weld groove having a generally V-shaped cross-sectional configuration.

The V-configured weld groove, though not to be construed as limiting the scope of the present invention, is the preferred weld groove configuration in accordance with the principles of the present invention. In any case, however, the groove must be wide enough at its top to provide clearance for the end of the welding electrode when the latter makes its initial pass along the length of the groove to deposit the lowermost weld layer.

An alternative weld groove configuration is the double-V cross-sectional configuration shown in FIG. 2. Here plates 22 and 24 abut at a junction 26 provided substantially midway through the thickness dimension of the plates, the plates diverging from the junction to form two oppositely directed V-shaped grooves, one each on other side of the interface.

As a further alternative a U-shaped groove (with parallel sides) could be utilized. However, the U-shaped groove requires deposit of considerably more weld metal at the bottom of the groove than is necessary for a satisfactory weld. This would be both time consuming and expensive, and could result in metallurgical degradation of the parent metal due to excessive heating.

As illustrated in FIG. 1, the weld joint includes a plurality of superposed generally pancake-shaped weld layers or deposits denoted 1 through 14, each deposit being numbered in accordance with its position in the sequence of deposition. These layers extend the entire length of the weld groove, i.e., into the plane of the drawing in FIG. 1. Each layer is a thin, flat deposit extending the entire width of the weld groove, and is formed by a single pass of the welding electrode, along the entire length of the groove. Weld layers 1 through 14 are preferably of substantially uniform thickness and extent of penetration into the parent metal.

The possibility of employing flat, generally pancake-shaped welds extending the entire width of a weld groove is not per se new to the arc welding art. However, such welds have always been regarded as poor practice, and have been rejected in preference to what may be termed "teardrop-shaped" welds. The latter are thick elongated weld beads deposited in partially overlapping manner to produce a cross section similar to that of a brick work pattern. By way of example, such a weld configuration is illustrated in U.S. Pat. No. 2,879,376.

The reason for past rejection of the elongated flat weld configuration is apparently that it has been thought to encourage the growth of long radial dendrites or crystal structure tending to produce a line of weakness at the center of the weld joint. It has been found, however, that for stainless steels, and other high-strength steels (18 percent nickel maraging steel, for example), the undesirable elongated dendrite pattern is substantially less pronounced than expected.

Additionally, the use of the generally pancake-shaped weld has been specifically rejected in the "submerged arc" flux welding processes because of resulting contamination of the weld deposit and inclusions of the welding flux therein. Further, pancake-shaped welds produced by "submerged arc" techniques produce a coarse surface at the top of each weld layer which is undesirable since a smooth surface promotes fusion with the next layer to be deposited. It has been found that these problems characteristic of submerged arc welding do not exist when gas-shielded arc welding processes such as the TIG process, are utilized.

With the discovery that such disadvantages do not exist in the present process, has come the additional discovery of certain special advantages. Specifically for a weld joint comprising the wide flat weld layers, fewer passes of the welding electrode are needed than for a weld joint formed of layers of teardrop-shaped welds. Consequently there are fewer cycles of heating of the parent metal, thereby reducing the tendency of the metal to crack due to repeated heating and cooling.

In addition, the flat, thin, pancake-shaped weld configuration promotes evolution of gas from the weld. This is advantageous since failure to achieve substantially complete gas evolution may result in cavities in the weld joint constituting potential areas of structural weakness. Further, because of the flat and relatively wide configuration of the weld layers, there is achieved a better heat distribution over a wider weld surface. This also tends to minimize cracking of the parent metal.

In addition, the relatively thin wide configuration of each weld layer permits rapid and uniform heating of the entire lower adjacent layer, thereby producing a desirable heat treatment to effect further grain refinement and uniformity of the weld. This is in clear contrast to the partially overlapping layers of the teardrop-type welds in U.S. Pat. No. 2,879,376, in which nonuniformity of heat transfer from one weld layer to the adjacent lower layer would be quite likely. None of the foregoing advantages of flat welds with the TIG process appears to have been recognized heretofore.

According to this invention, the preferred substantially uniform thickness of pancake-shaped layers 1 through 14, the uniform area of penetration at the weld deposit-parent metal interface at edges 25 and 27, as well as the important uniform heat input to the parent metal, are achieved by varying welding parameters for successive passes of the welding electrode along the length of the welding groove. Specifically, the arc voltage, arc current, and filler wire feed rate are adjusted for each layer, but the speed of the electrode in traversing the groove length is preferably maintained substantially constant for each pass.

A primary consideration as pointed out above is the necessity to maintain a substantially constant heat input to the parent metal and to the lower adjacent weld layer. There are several reasons for this. Primarily, what is required is that the minimum possible heat input be provided to avoid a large heat-affected zone in the parent metal and the undesirable metallurgical characteristics produced thereby. However, enough heat must be provided to thoroughly wet the upper surface of the previous weld layer and the groove walls to provide adequate fusion and a good bond between the weld deposit and the parent metal. The flat pancake-shaped welds coupled with the variable parameter TIG technique minimizes the possibility of areas of lack of fusion between the weld and the parent metal at the side of the groove. This beneficial result is achieved by proper choice of welding parameters from pass to pass.

Another factor to be considered is that the V-groove configuration requires that successively wider weld layers be deposited by corresponding successive passes of the welding electrode. Thus, for each successive pass, more filler material is necessary and more heat is required to melt the additional filler material so as to produce a wider molten weld puddle and still deposit weld layers of substantially uniform thickness.

It has been found that other parameters being unchanged, increasing the arc voltage from pass to pass produces successively wider molten weld puddles. The relationship has been found to be nearly linear whereby the widths of which can readily be controlled by the arc voltage level. Of course, increased arc voltage results in increased electric power delivered to the weld joint; consequently successive passes generate successively greater amounts of heat. Nonuniform heating of the parent metal from pass to pass, as explained above, should be avoided to eliminate undesirable metallurgical properties in the parent metal. Thus, the additional heat produced by increasing the arc voltage must be correlated with an increased filler wire feed rate. The filler wire feed rate should be adjusted for each pass, therefore, so that melting of the filler material consumes substantially all of the additional heat produced by increasing the arc voltage. The excess heat cannot therefore undesirably affect either the previously completed portions of the weld or the parent metal. The speed of the electrode is preferably maintained substantially constant from pass-to-pass, so that the speed of the electrode, of itself, does not introduce variations in the amount of heat delivered to the weld joint during successive passes.

A conflicting requirement enters here because it has been found that to produce uniform thickness of the weld layers, more filler material is required for successive layers than can be effectively melted by the amount of heat added through the successive voltage increases. At first glance, it would appear that this problem could be simply overcome by further increasing the arc voltage; however, this has proved to be undesirable because increasing the voltage sufficiently to melt the additional filler material produces a molten weld puddle which is too wide for the particular depth of the groove. This produces an undesirable fusion with the parent metal, and a penetration by each weld deposit in a nonuniform manner. If the penetration is too great, the weld deposit does not congeal in a uniform flat cross section but rather takes on a generally mushroom shape wherein fusion is achieved along the center and sides of the lower adjacent weld layer but not inbetween. The resulting voids and lack of fusion areas between adjacent weld layers is highly undesirable and substantially reduces the strength of the weld joint.

It has, however, been found that for other parameters held constant, the depth of a weld puddle will vary linearly with the current.

Thus, by increasing the arc current upon successive passes of the welding electrode, in relation to the depth of the weld, the required amount of heat in excess of that which can be produced by increasing the arc voltage is obtained with the result that both the desired depth and width of each weld layer is achieved.

As illustrated in FIG. 1, the top two layers of the weld joint are not formed from respective individual deposits extending entirely across the width of the weld; rather, each of the top two layers is formed by two separate but adjacent passes of the welding electrode. Thus, deposit 15 is formed by a pass of the welding electrode along the entire length of the weld and extends from plate 21 toward the center of the weld joint, tapering in thickness in the region proximate the center of the thickness of the weld joint. Similarly, deposit 16 extends from plate 23 toward deposit 15, overlapping the latter proximate the center of the weld so that a relatively flat surface is provided for the layer comprising the side-by-side deposits 15 and 16. Similarly, the top layer of the weld joint comprises adjacent or side-by-side deposits 17 and 18 which overlap substantially centrally of the weld joint to provide a substantially flat top surface for the weld joint.

Side-by-side weld deposits to form the top one or two layers of the weld joint are preferred to minimize the possibility that an area of lack of fusion may develop at the top of the weld joint at the weld deposit-parent metal interface (that is, at edges 25, 27). Actually, one of the reasons for disapproval of the flat, generally pancake-shaped weld in the past, has been the fact that the edge of such a weld layer was often rounded adjacent the weld deposit-parent metal interface. Upon deposition of the immediately adjacent upper layer thereupon, the flat lower surface of the upper layer did not fill in the void formed between the rounded edge of the lower weld and the groove wall. Consequently, small wedge-shaped areas of lack of fusion developed. The variable parameter TIG technique disclosed herein avoids these areas of lack of fusion if the welding parameters are properly adjusted to provide successive layers of uniform thickness. However, it is conceivable that the topmost layer or layers of the weld joint, even using the variable parameter TIG technique, may sometimes be rounded at the edge leaving an area in which stresses in the weld would arise and significantly weaken the entire weld.

The above-described problem of eliminating areas of lack of fusion adjacent the groove walls could be overcome by making a single upper layer of the weld substantially larger than the other layers and larger than that necessary to fill the weld groove, thereby in effect producing a large crown extending upwardly and transversely of the top of the weld joint. This would ordinarily have to be ground away, which is both time consuming and uneconomical. In contrast, it has been found that providing the side-by-side deposits to form the top one or two weld layers fills in the rounded upper edges of the adjacent lower pancake-shaped layer and thereby avoids areas of lack of fusion. These smaller side-by-side deposits extend only slightly above the upper surface of plates 21 and 23 and therefore require considerably less, if any, grinding.

A single layer of adjacent or side-by-side deposits may be utilized atop the multiple pancake layers; however, two layers of side-by-side deposits are preferred. It is also preferred, where two or more side-by-side layers are utilized, that the longitudinal seam between the two side-by-side deposits (i.e.—the region of overlap between the side-by-side deposits) be offset somewhat so that if there is any weakness in the overlap region, two such regions are not aligned vertically.

As will be appreciated, conventional TIG welding apparatus with an adequate power supply adjustment range may be employed in practicing the present invention. However, one suitable modification which provides a trailing gas shield is illustrated in FIG. 3. Here, a secondary flat box-shaped shield with a lower perforated plate is connected to the supply of inert gas, and lower portion of the welding torch, is positioned in such a manner that the cooling portion of the deposited weld is provided with a protective gas shield.

As illustrated, the tungsten electrode 31 is surrounded at the lower end of the welding torch by a gas cup 33 to which pressurized inert gas (helium, argon, etc.) is applied and issued in a stream about the electrode. Trailing shield member 35 is secured to cup 33 and extends rearwardly thereof.

Shield 35 is a hollow, boxlike structure having a large number of openings (not shown) on the lower surface adjacent to the workpiece. A tube or conduit 37 connects gas cup 33 to shield 35 to provide the required gas.

Thus, as electrode 31 is passed over workpiece 39 in the direction of the arrow in FIG. 3, filler wire 41 is fed into the arc as the electrode proceeds along the length of the workpiece. The inert gas issues from the perforations on the bottom of shield member 35 to protect the cooling portion of the molten weld against contamination from the atmosphere.

Table I below illustrates the degree of welding parameter variation employed in the process of the present invention.

TABLE I

| Deposit No. | Arc current (amps) | Arc voltage | Filler wire diameter (in.) | Filler wire speed (in./min.) | Electrode diameter |
|---|---|---|---|---|---|
| 1 | 160 | 10 | 1/16 | 7½ | 1/8 |
| 2 | 180 | 11 | 1/16 | 20 | 1/8 |
| 3 | 200 | 12 | 1/16 | 22¾ | 1/8 |
| 4 | 220 | 13 | 3/32 | 16 | 1/8 |
| 5 | 240 | 14 | 3/32 | 18 | 1/8 |
| 6 | 270 | 15 | 3/32 | 21 | 1/8 |
| 7 | 300 | 16 | 3/32 | 25½ | 1/8 |
| 8 | 320 | 17 | 3/32 | 32 | 1/8 |
| 9 | 340 | 18 | 3/32 | 37 | 1/8 |
| 10 | 340 | 18 | 3/32 | 40 | 1/8 |
| 11 | 340 | 18 | 3/32 | 41½ | 1/4 |
| 12 | 340 | 18 | 3/32 | 41½ | 1/4 |
| 13 | 340 | 18 | 3/32 | 41½ | 1/4 |
| 14 | 340 | 18 | 3/32 | 41½ | 1/4 |
| 15 | 340 | 18 | 3/32 | 41½ | 1/4 |
| 16 | 340 | 17 | 3/32 | 41½ | 1/4 |
| 17 | 340 | 18 | 3/32 | 43½ | 1/4 |
| 18 | 340 | 18 | 3/32 | 43½ | 1/4 |

The table lists the parameters (arc current, arc voltage, filler wire size, electrode size and filler wire feed rate) employed for each of the deposits 1 through 18 illustrated in the weld joint of FIG. 1. The respective parameters were utilized in joining two 1⅛ inch thick plates (21, 23) of 18 percent nickel 250 K.s.i. maraging steel using TIG techniques with the parameters indicted. Helium was used as the gas shield. Interface 29 was three thirty-second inch long and the radius of curvature of the vertex of the V-shaped groove was one-eighth inch. The sides of the groove subtended a 20° angle with the vertical (as viewed in FIG. 1).

It should be noted that the reduction in filler wire speed between deposits 3 and 4 is a result of changing to a larger diameter filler wire between these deposits.

Implicit in the foregoing, is the fact that each weld layer is permitted to cool prior to deposit of the next layer. In this connection, however, it should be pointed out that the weld should be allowed to cool below the martensite finish temperature of the metal for best results. For example, in the case of 18 percent Ni maraging steel, each weld layer should be allowed to cool below about 200° F. before the succeeding layer is deposited.

In an effort to compare the variable parameter TIG process disclosed herein with the conventional TIG and "Big TIG" processes referred to above, all three processes have been employed to join high-strength steel plates (18 percent nickel maraging steel) three-fourths and 1¼ inches thick. Upon testing the various welded plates, it is found that the variable parameter TIG process provides a significant improvement in the fracture roughness of the welded joint over the fracture toughness provided by the older TIG techniques. In some cases, improvement of 15–30 percent in fracture stress over the "Big TIG" technique, and 30–45 percent increase in fracture stress over the conventional TIG technique, was achieved with the variable parameter TIG process of the present invention.

The results of these tests are set out in table II.

Specifically, a slow bend notch test was employed as described by Irwin et al. "Fracture Strengths Relative to Onset and Arrest of Crack Propagation," Proceedings of the ASTM, Vol.

TABLE II.—TIG PROCESS STUDIES

| Welding method | Welding parameters | | Fracture toughness, $K_{Ic}$ K s.i. in— | | |
|---|---|---|---|---|---|
| | Amps | Volts | Notch location | NRL formula, K s.i. $\sqrt{in}$ | NASA formula, K s.i. $\sqrt{in}$ |
| Conventional Tig 1¼" Plate Air Melt | 210 | 12 | W, Sur. W, Side HAZ, Sur. (1) | 72.0 76.4 86.1 | 74.5 79.6 90.3 |
| Big Tig 1¼" Plate Air Melt | 295 | 12 | W, Sur. W, Side HAZ, Sur. HAZ, Sur. | 77.5 76.7 102.0 95.4 | 83.3 80.0 106.9 100.9 |
| Conventional Tig 1¼" Plate Air Melt | 250 | 12 | W, Sur. W, Side HAZ, Sur. HAZ, Sur. | 70.3 78.3 85.5 101.3 | 73.3 81.2 90.8 106.1 |
| Big Tig 1¼" Plate Air Melt | 340 | 12 | W, Sur. W, Side HAZ, Sur. HAZ, Sur. | 81.9 75.5 88.9 88.3 | 86.5 78.5 93.6 92.4 |
| Big Tig 1¼" Plate Air Melt | 405 | 12 | W, Sur. W, Side HAZ, Sur. | 78.1 74.2 92.1 103.0 | 82.7 78.4 98.7 108.3 |
| V.P. Tig ¾" Plate Vac. Melt | 160–300 | 10–12 | W, Side W, Sur. W, Sur. W, Side W, Side W, Side | 75.9 102.5 80.9 76.9 83.3 80.4 | 81.0 107.1 87.4 81.0 85.6 83.1 |
| V.P. Tig ¾" Plate | | | W, Sur. W, Side HAZ, Sur. F, Sur. | 99.7 80.0 109.3 107.5 | 102.4 83.7 113.7 112.1 |
| V.P. Tig ¾" Plate | 160–340 | 10–18 | W, Sur. W, Side HAZ, Sur. F, Sur. | 103.8 95.4 105.1 112.3 | 108.8 100.2 110.2 117.4 |
| V.P. Tig One-side Weld 1¼" Plate | 160–340 | 10–18 | W, Sur. B W, Sur. B W, Sur. T W, Sur. T W, Side W, Side HAZ, Sur. B HAZ, Sur. T | 92.4 88.8 101.0 124.0 86.2 85.6 118.5 132.6 | 96.5 94.6 107.2 129.5 89.4 89.4 122.7 140.2 |

[1] Specimen broke during fatigue.

58, 1958. Fracture toughness $G_{Ic}$ (in.-lb./in.$^2$) was calculated from the formula $$G_{Ic} = \frac{1}{2}\left(\frac{P}{B}\right)^2 \frac{d}{da}\left(\frac{B}{M}\right) \quad (1)$$

where: $P/B$ = bending load at fracture per unit width of the Test bar; and $d/da(B/M)$ = slope of the experimental curve for the reciprocal of the spring modulus at a notch depth "$a$" (determined from light load bending tests in the elastic range and on calibration specimens having notches of different depths).

For reporting purposes, the data was converted to stress intensity $K_{Ic}$ according to the relationship;

$$K_{Ic} = \sqrt{E\, G_{Ic}} \quad (2)$$

Data obtained from equation 2 is listed in table II under the heading "NRL Formula." Also reported under the heading "NASA formula" are values of $K_{Ic}$ obtained according to Srawley & Brown, "Fracture Toughness Testing," N.A.S.A. TN–D2599, Jan. 1965.

In conducting the tests, specimens were welded, prepared and tested as described by Irwin et al. supra. In the tables, the designations in the column headed "Notch Location" are defined as follows:

a. "W, Sur" refers to the weld surface as viewed in the direction indicated by the arrow "A" in FIG. 1.

b. "W, Side" refers to the weld side as viewed into the plane of FIG. 1.

c. "HAZ Side" refers to the heat-affected zone of the parent metal adjacent the side of the weld.

d. "HAZ Sur" refers to the surface of the heat-affected zone of the parent metal adjacent the weld.

e. "B" and "T" refer to the bottom and top, respectively of the weld or parent metal heat-affected zone.

f. "F, Sur" refers to fusion zone of weld metal and parent metal.

Test specimens were obtained in all cases by sectioning across the weld, i.e. in planes parallel to the paper in FIG. 1.

In summary, the invention as described comprises employment of a substantially uniform weld, built up in layers of flat generally pancake-shaped deposits, each layer filling the entire transverse width of the weld groove with a single pass. In addition, a V-shaped groove is provided of sufficient width at its top relative to its depth to provide clearance for the lower end of the welding electrode during the pass which deposits the lowermost layer.

Selective control of the welding parameters for succeeding deposits is utilized to provide uniform penetration into the parent metal, complete fusion along the edges of the welding groove, and uniform heating of successive layers in the weld. The result is a weld having an extremely low tendency toward cracking and extremely high fracture toughness comparable to that of the parent metal.

Variation of the parameters may be accomplished either manually or automatically between passes of the welding electrode while the previous deposit is cooling. Automatic adjustment would be accomplished by a step-by-step programmer which would automatically set the arc current, arc voltage and filler wire feed rate for each pass. Where manual adjustment is provided, a predetermined chart of values would normally be provided for the welder to assure proper setting for each pass of the welding electrode.

While I have described and illustrated one specific embodiment of my invention, it will be clear that variations of the details of construction which are specifically illustrated and described may be resorted to without departing from the true spirit and scope of the invention as defined in the appended claims.

I claim:

1. A method of forming a weld between relatively thick high-strength metal plates by means of a Tungsten Inert Gas welder having a nonconsumable tungsten electrode, which method comprises:

positioning the plates in adjacent edge-to-edge relationship, the adjacent edges of said plates being formed to define a weld groove therebetween;

forming an arc by establishing an arc current between the tungsten electrode and the metal plates and by maintaining an arc voltage between the tungsten electrode and the metal plates;

moving the tungsten electrode along the length of said weld groove;

feeding a fusible filler material into said arc at a controlled rate to form a layer of weld metal in said weld groove;

repeating the preceding steps to deposit successive layers of weld metal in said weld groove, each of said layers extending along the entire length and width of said weld groove to provide a substantially flat-topped surface for each layer; and controlling the arc voltage, arc current, and the rate at which said fusible filler material is fed into the arc during deposit of successive layers of weld metal to provide substantially uniform heat input into said metal plates and previously deposited layer.

2. The process according to claim 1 wherein at least one of said successive layers of weld metal is formed by making two adjacent passes of said tungsten electrode over the length of said weld groove to provide a pair of side-by-side deposits of weld metal having a region of overlap therebetween to provide a substantially flat top surface for the weld, said side-by-side deposits extending along the entire length of said weld groove.

3. The process according to claim 2 wherein at least one additional layer comprising a pair of side-by-side deposits of weld metal is deposited atop said first-mentioned pair of side-by-side deposits, said additional layer having a region of overlap between its pair of side-by-side deposits which is slightly offset from the region of overlap between said first-mentioned pair of side-by-side deposits.

4. The process according to claim 1 wherein said metal plates are at least three-fourths of an inch thick.

5. The process according to claim 1 wherein said arc voltage is increased as a function of the width of the layer of weld metal being deposited within the range of between about 10 and 26 volts.

6. The process of claim 5 wherein said arc current is increased as a function of weld groove depth within the range of between 150 and 350 amperes.

7. The process according to claim 1 wherein said plates and said weld material exhibit martensitic structure, and further including cooling each layer to a temperature below the "martensite finish" temperature for the particular metal before the next layer is deposited.

8. The process according to claim 1 wherein a shield of inert gas is provided for cooling the weld metal behind the moving tungsten electrode.

9. The process according to claim 1 wherein the width of the weld groove is sufficient to permit clearance for said tungsten electrode when forming the first-mentioned layer of weld metal.

10. An arc welding process for forming a weld between thick plates of high-strength steel employing a welder having a nonconsumable electrode, which process comprises:

forming an inclined edge on each of said plates;

positioning said plates with said inclined edges in adjacent relationship to define a generally V-shaped weld groove between said plates;

forming an arc by establishing an arc current between the nonconsumable electrode and the metal plates and by maintaining an arc voltage between the nonconsumable electrode and the metal plates;

feeding a fusible filler material into said arc which filler material is melted by said arc to form a weld metal;

traversing said weld groove longitudinally with the nonconsumable electrode to form a layer of weld metal of predetermined thickness extending the entire length and width of said weld groove;

enveloping said arc with a blanket of inert shielding gas;

cooling said layer of weld metal;

repeating the previous steps to deposit additional layers of weld metal in said weld groove, each additional layer also being of said predetermined thickness and extending substantially the entire length and width of said weld groove until substantially the entire depth of said groove has been filled; and adjusting the arc current, arc voltage, and the rate of feeding the fusible filler material to said arc for each layer being deposited to maintain a substantially constant net heat input to said plates and to the previously deposited layer of weld metal.

11. An arc welding process as defined in claim 10 wherein said plates and said weld metal exhibit martensitic structure, and wherein each of said layers of weld metal is cooled to a temperature below the martensite finish temperature for said plates and said weld metal before an additional layer of weld metal is deposited.

12. An arc welding process as defined in claim 10 wherein the arc voltage provided to said nonconsumable electrode is adjusted in substantially linear relationship according to the width of said weld groove.

13. An arc welding process as defined in claim 12 wherein said arc current provided to said nonconsumable electrode is adjusted in substantially linear relationship according to the depth of said weld groove.

14. An arc welding process as defined in claim 10 further including the step of providing a blanket of said inert gas behind said nonconsumable electrode to shield the layer of weld metal during cooling.